SIMPLIFIED ANALOG COMPUTER AND SIMULATOR HAVING SYNCHRONOUSLY SWITCHED INPUT AND OUTPUT TO EFFECT TIME-SHARING

Filed May 12, 1964

United States Patent Office 3,390,258

Patented June 25, 1968

3,390,258

SIMPLIFIED ANALOG COMPUTER AND SIMULATOR HAVING SYNCHRONOUSLY SWITCHED INPUT AND OUTPUT TO EFFECT TIME-SHARING

Takeo Miura, Tokyo-to, and Junzo Iwata, Kodaira-shi, Japan, assignors to Kabushiki Kaisha Hitachi Seisakusho, Tokyo-to, Japan, and Hitachi Denshi Kabushiki Kaisha, Kodaire-shi, Japan, both joint-stock companies of Japan Filed May 12, 1964, Ser. No. 366,746
Claims priority, application Japan, May 15, 1963, 38/24,164
3 Claims. (Cl. 235—184)

ABSTRACT OF THE DISCLOSURE

A time-shared analog computer and simulator for compensation of errors due to dead time arising from time-sharing, which utilizes a computing element commonly used for a plurality of channels, change-over switches for scanning the input and output of the computing element, a plurality of holding circuits to hold the respective channel outputs of the computing element, and a plurality of compensating circuits to compensate dead time substantially corresponding to the quantity represented by $$\left\{\tau+\frac{T}{2}\left(1-\frac{1}{n}\right)^2\right\}$$

wherein $\tau$ denotes the dead time required for computation, T denotes the scanning period, and $T/n$ represents the time interval during which each of said holding circuits is connected to the output of said computing element and correctly follows up variations in the output of said computing element as well as variations in the output of said computing element within one cyclic period.

This invention relates to analog computers, and more particularly it relates to a new time-shared analog computer and simulator in which the circuit arrangement is simplified by utilization of a time-sharing method, and in which errors arising from time-sharing are greatly reduced.

In the case when a computer setup is to be composed of analog computers or in the case when a simulator for a special objective system is to be constructed, a large number of computer setups of equal input and output characteristics are often included in the computer setups. One example is the case wherein partial differential equations are solved by transforming them into difference equations; another example is the case wherein, in a system to be simulated, there is a large number of elements having the same characteristics.

It is an object of the present invention to provide a time-shared analog computer and simulator wherein, in the case where there are a large number of parts having the same input and output characteristics among computer setups as described above, only one of such parts is provided, its input and output are switched synchronously to effect time sharing, and, moreover, the errors arising from this time-sharing method are compensated for to obtain more correct computation solutions.

The specific nature, principle, and details of the invention will be more clearly apparent by reference to the following description, taken in conjunction with the accompanying drawings in which like parts are designated by like reference characters, and in which.

Figure 1:
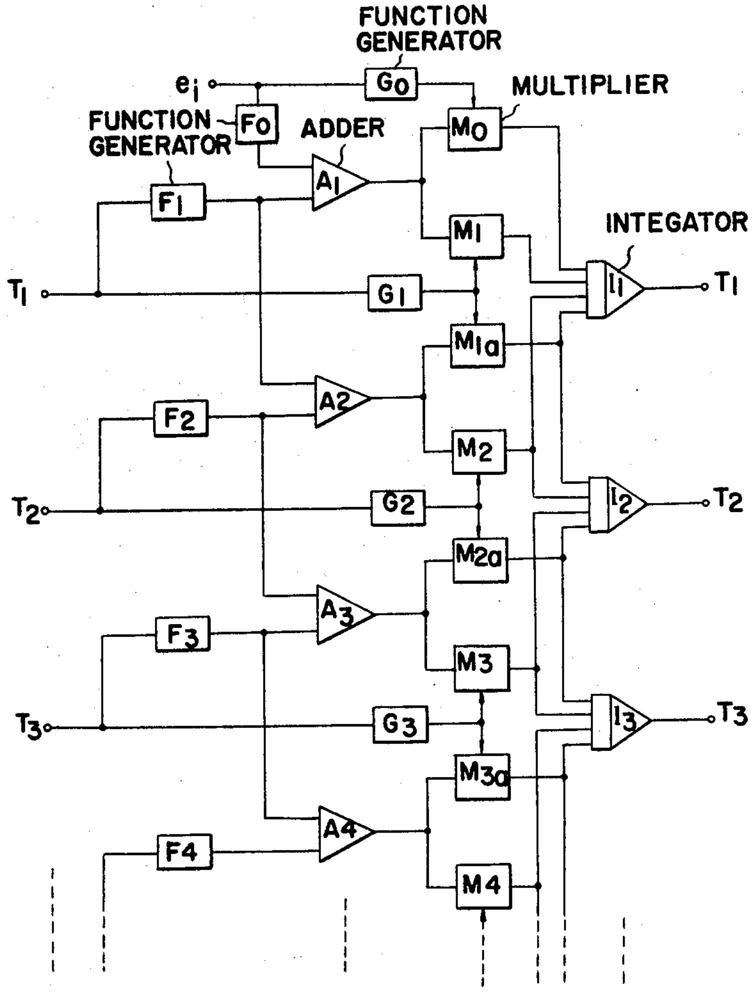
FIG. 1 is a block diagram representing one example of an ordinary computer setup taken as an object to be studied in the present invention.

One example of an ordinary computer setup to be taken as an objective system in the present invention is shown in FIG. 1. In this arrangement there are provided adders $A_1$, $A_2$, $A_3$, . . . , integrators $I_1$, $I_2$, $I_3$, . . . , function generators $F_0$, $F_1$, $F_2$, . . . and $G_0$, $G_1$, $G_2$, $G_3$, . . . , the functions to be set of the F group and the G group being respectively equal, and multipliers $M_0$, $M_1$, $M_{1a}$, $M_2$, $M_{2a}$, . . . . The circuit receives an input $e_1$, and the integrators produce outputs $T_1$, $T_2$, . . . . This computer setup illustrates one example wherein a certain partial differential equation is being solved by transformation into a difference equation and, as can be observed from FIG. 1, requires a large number of nonlinear elements.

The solutions for the differential equations of the above-mentioned respective operational elements as well as combination thereof are described in a reference book such as, for example, "Electronic Analog Computors (D-C Analog Computors) by Granino A. Korn and Theresa M. Korn, published by McGraw-Hill Book Company, Inc., 1956. At page 13 of this book, there is described an example of an adder; at page 17, an integrator; and, at pages 251–340, a multiplier and a function generator.

Figures 2, 3:
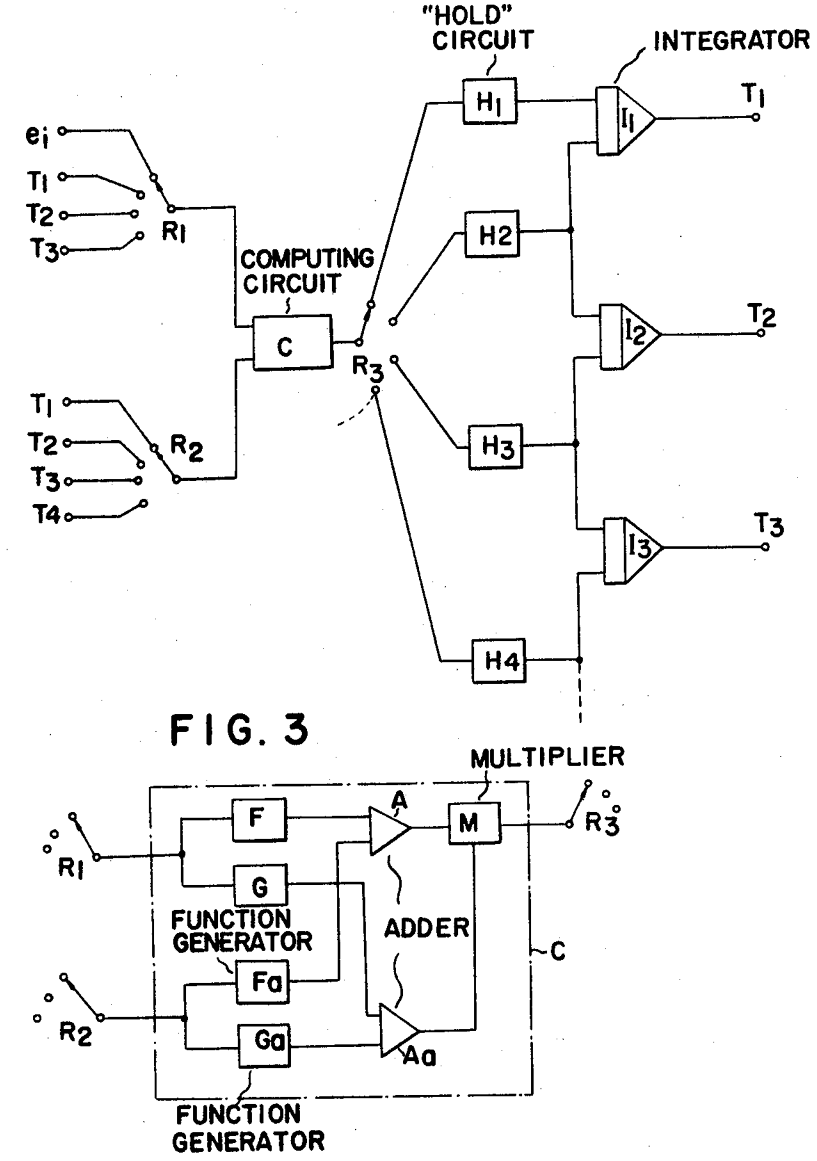
FIG. 2 is a block diagram indicating a circuit obtained by forming the computer setup shown in FIG. 1 by a conventional time-sharing method.
FIG. 3 is a block diagram indicating the details of one part of the circuit shown in FIG. 2.

FIG. 2 illustrates one example of the case where this circuit of FIG. 1 is arranged in accordance with a conventional time-shared computation system. In the computer setup shown in FIG. 1, there are a large number of parts which, with the outputs $T_i$ and $T_{i+1}$ of contiguous integrators as inputs, carry out computations of the same form represented by the following equation. The suffix $i$ indicates any arbitrary numerical figure of 1, 2, 3, . . . as is frequently used for ordinary mathematical expressions $$C(T_i+T_{i+1})=\{F(T_i)+F(T_{i+1})\} x\{G(T_i)+G(T_{i+1})\} \quad (1)$$

Accordingly, in the circuit of FIG. 2, only one computer setup C of the above Equation 1 is used, the input being selected by input scanning changeover switches $R_1$ and $R_2$, the computation results being selected in synchronism with the input side by an output scanning changeover switch $R_3$, and the selected outputs being respectively held temporarily in "hold" circuits $H_1$, $H_2$, $H_3$, . . . . Such hold circuit will sufficiently serve the purpose by use of known memory circuits utilizing, for example, a capacitor, etc., or the circuit as shown and described in FIG. 7.3 and page 347 of the abovementioned reference book by Korn and Korn. While the outputs of the computer setup C are being applied to the other channels, the "hold" circuit $H_i$ (where $i=1, 2, 3, \ldots$) holds the value immediately prior to the changeover to the succeeding channel. The computer setup of the part C is shown in greater detail in FIG. 3.

If, in a time-shared computer setup of this type, the changeover speeds of the switches are caused to be amply high with respect to the computation frequency, solutions equivalent to those in the case where a large number of computer sets up are provided in parallel as shown in FIG. 1 can be obtained. In this case, however, an error is introduced. More specifically, if the input of a certain one integrator (that is, an output resulting from time-shared computation) is considered, it is found that, when an input as represented by the dotted line 1 in FIG. 4 should be obtained as the correct input, an input of the form represented by the full-line curve 2 is actually introduced. As a result, the integrator output is also caused to contain a small amount of error. Since this erroneous integrator output is returned to the input side to carry out computation, the error accumulates, and correct computation result cannot be obtained.

In order to decrease this error, one possibility is to increase the switching frequency, but this frequency, being limited by the frequency characteristic of the computer setup C, cannot be increased above a certain level.

The present invention contemplates the provision of compensation means whereby the above described drawback is eliminated, and correct solutions can be obtained even with relatively slow switching periods.

Figure 4:
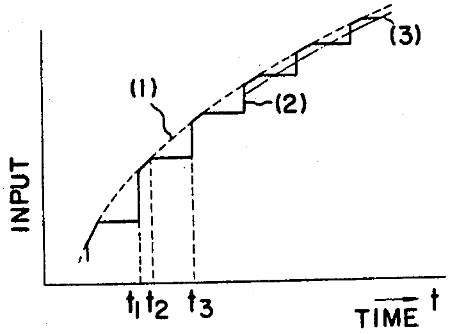
FIG. 4 is graphical representation of an input waveform.

Referring to FIG. 4, when an input of staircase waveform as shown by the full-line curve 2 enters an integrator, the effect of this input on the integrator output is approximately equal to that in the case when an input as indicated by the chain-line curve 3, which is the result of taking the mean of the curve 2 to produce a smooth curve, is introduced. This equivalent, chain-line input curve 3 may be obtained, as indicated in the enlarged representation in FIG. 5, by making the areas of the trapezoid *eabf* and the triangle *fcg* equal.

Figure 5:
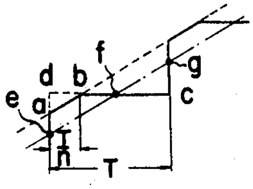
FIG. 5 is an enlargement of one part of the representation in FIG. 4.

Therefore, as is apparent from FIG. 5, the triangle *fcg* is equal to $\Delta edf - \Delta adb$, and, moreover, since these two triangles *edf* and *adb* are like figures, the respective areas thereof are proportional to the square of the respective sides. Accordingly, the following equation is established.

$$\overline{df}^2 - \overline{db}^2 = \overline{fc}^2 \tag{2}$$

On the other hand, from FIG' 5, $$\left.\begin{aligned} \overline{df} &= \frac{T}{n} + \overline{bf} \\ \overline{db} &= \frac{T}{n} \\ \overline{cf} &= T - \left(\frac{T}{n} + \overline{bf}\right) \end{aligned}\right\} \tag{3}$$

When Equation 2 is substituted for the above Equation 3, $$\left(\frac{T}{n} + \overline{bf}\right)^2 - \left(\frac{T}{n}\right)^2 = \left\{T - \left(\frac{T}{n} + \overline{bf}\right)\right\}2$$

$$\left(\frac{T}{n}\right)^2 = T^2 - 2T\left(\frac{T}{n} + \overline{bf}\right)$$

$$\therefore \overline{bf} = \frac{T}{2} - \frac{T}{n} + \frac{T}{2n^2} = \frac{T}{2}\left(1 - \frac{2}{n} + \frac{1}{n^2}\right) = \frac{T}{2}\left(1 - \frac{1}{n}\right)^2$$

$$\overline{bf} = \frac{T}{2}\left(1 - \frac{1}{n}\right)^2 \tag{4}$$

where:

T is the time for one cycle of switching; and
$T/n$ is the computation time allotted to one channel.

That is, the actual output is substantially equal to the output in the case when the input is one which is delayed by $$\frac{T}{2}\left(1 - \frac{1}{n}\right)^2$$

behind the correct input.

In the above analysis, the computer setup C is considered to be ideal, and it is assumed that at the instant when a switch is switched to a certain channel, the correct value of that channel is produced as output. However, depending on the character of the computer setup, a dead time (time delay) $\tau$ is sometimes required before the correct value is produced as output. In one case, for example, output is obtained by a procedure which involves converting an analog input from input scanning switches $R_1$ and $R_2$ into a digital signal, using this digital signal to carry out computation by digital technique, and converting the digital computation result so obtained into an analog signal as the output. In this case, the result obtained is delayed by $$\tau + \frac{T}{2}\left(1 - \frac{1}{n}\right)^2$$

which includes the above mentioned dead time component $\tau$.

In such a case when there is a dead time, the time $T/n$ sometimes becomes short, and the time during which the correct value is produced is only an instant, that is, $n = \infty$. In such cases, also, the result according to the above consideration is valid.

The present invention, in one of its aspects, is based on the observation that, in the case of time-shared computation by the "hold" method as described above, an equivalent dead time equal to $$\tau + \frac{T}{2}\left(1 - \frac{1}{n}\right)^2$$

occurs, and the invention provides a computer setup having means to compensate for this dead time and thereby to produce correct solutions.

Figure 6:
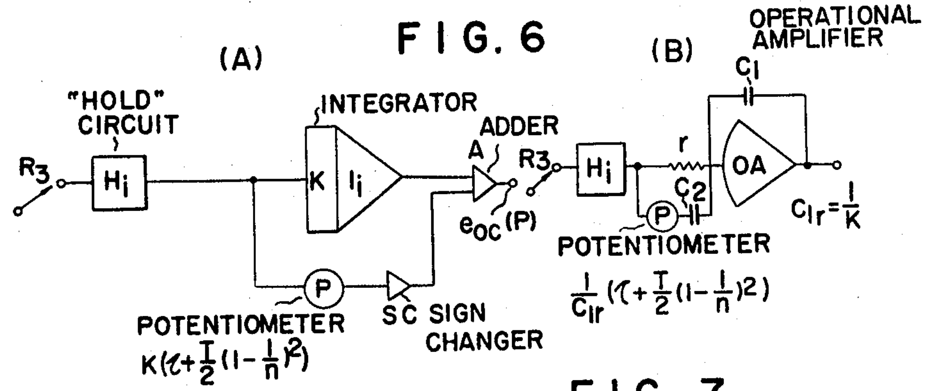
FIGS. 6 and 7 are schematic diagrams respectively showing the essential parts of embodiments of the invention.

FIG. 6 shows one embodiment of the invention illustrating the method employed in the frequently occurring case wherein, as indicated in FIG. 2, computation results produced by time-sharing in the above described manner become the inputs of integrators. The abovementioned potentiometer, sign changer, etc. to be used for the purpose can be those as described in the aforementioned literature. From the fact that, in the case where the input of an integrator $I_i$ (i.e., the output of hold circuit $H_i$) is obtained by time-shared computation, a dead time as described above occurs, the input in this case expressed in the form of a Laplace transformation $e_{is}(p)$ may be expressed by the following equation in terms of the correct input of the integrator $I_i$ in the form of a Laplace transformation $e_i(p)$.

$$e_{is}(p) = e_i(p) \exp\left[-\left\{\tau + \frac{T}{2}\left(1 - \frac{1}{n}\right)^2\right\}p\right]$$

$$= e_i(p)\left(1 - T_d p + \frac{T_d^2 p^2}{2!} - \frac{T_d^3 p^3}{3!} + \dots\right)$$

where:

$$T_d = \tau + \frac{T}{2}\left(1 - \frac{1}{n}\right)^2 \dots \tag{5}$$

Here, if the Laplace transformation of the input at the time when there exists no dead time $T_d$ is assumed $e_i(p)$, the Laplace transformation form $e_{is}$ at the time when there exists dead time $T_d$ can be expressed by $e_{is} = e_i(p) \exp\{(-T_d)p\}$. This expression is available from ordinary text books of mathematics or automatic control such as, for example, "Servomechanism and Regulating System Design," by Chestnut & Mayer, vol. 1, 1955, New York. Since the resulting output $e_0(p)$ is subjected to an operation represented by $k/p$ by the integrator ($k$ being the multiplying factor of the integrator), the following equation is obtained.

$$e_0 = \frac{k e_{is}(p)}{p}$$

$$= e_i(p)\left(\frac{k}{p} - T_{dk} + \frac{T_d^2 p^2 k}{2!}\right. \tag{6}$$

$$\frac{T_d^3 p^3 k}{3!} \dots$$

Since $$\frac{K e_{is}(p)}{p}$$

is desired as the correct solution, this solution may be obtained by a computation which eliminates the second term and other terms thereafter in the righthand side of the above equation. As one means for this purpose, a potentiometer P is used as indicated in FIG. 6A to multiply the input by $kT_d$, and the resulting product is added to the integrator output through a sign changer SC. Accordingly, by such arrangement, instead of the integrator output $T_1$ in FIG. 2, an output $e_{0c}(p)$ which is expressed by the following equation can be obtained.

$$e_{0c}(p)=e_{is}(p)\left(\frac{k}{p}+kT_d\right)$$
$$=e_i(p)\left(\frac{k}{p}+kT_d\right)\left(1-T_dp+\frac{T_d^2p^2}{2!}-\frac{T_d^3p^3}{3!}\cdots\right)$$
$$=e_i(p)\frac{k}{p}\left(1-\frac{1}{2}\right)T_d^2pk+\left(\frac{1}{2!}-\frac{1}{3!}\right)T_d^3p^2k \quad (7)$$

Since the second term which has the greatest effect on the error is thereby eliminated, the computation accuracy is greatly elevated. In other terms, this means that the sampling period T can be substantially increased without lowering the computation accuracy.

The arrangement shown in FIG. 6 further includes a sign changer SC and an adder A. In a computer setup provided with such a compensation circuit, it is possible to consolidate the operational amplifiers into a single amplifier OA as shown in FIG. 6B. If, in the arrangement shown in FIG. 6B, the capacitors $C_1$ and $C_2$ are of equal capacitance, they function as a sign changer, and the output of this integrator circuit is the sum of an integrated output of an input applied through the input resistance $\gamma$ and an output of a multiple of $$K\left[\tau+\frac{T}{2}\left(1-\frac{1}{n}\right)^2\right]$$

due to an input applied by way of the potentiometer P and the capacitor $C_2$. Actually, since the switching period is small, the voltage division ratio of the potentiometer is too small under the above described condition. Therefore, a low capacitance of the capacitor $C_2$ and a high voltage division ratio of the potentiometer P such that their product will be equal to $$C_1K\left[\tau+\frac{T}{2}\left(1-\frac{1}{n}\right)^2\right]$$

are used. Particularly in the case where a capacitor such as will cause the voltage division ratio of the potentiometer P to be equal to unity is selected, the potentiometer P may be omitted.

In the case when the output of the time-shared computation is not the input of the integrator, i.e., when the integrator is not used, the said output, itself, may be caused to lead by $T_d$. For this purpose, it is necessary to preestimate the value in the future, said value occurring after, by $T_d$, from the computation result obtained so far up to the time under consideration and to present this value as the output.

Figure 7:
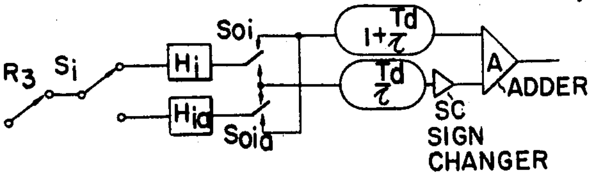

In one embodiment of the invention as shown in FIG. 7 for the above purpose, there are provided for one channel two sample "hold" devices $H_i$ and $H_{ia}$. When switches $S_i$, $S_{oi}$, and $S_{oia}$ are switched synchronously and caused to sample "hold" alternately for every period, the value (denoted by $Y_0$) sampled immediately prior to any time under consideration and the sampled value (denoted by $Y_{-1}$) which is earlier by one period than $Y_0$ are held in the "hold" state in the sample "hold" devices. Therefore, by using these values, Y corresponding to said loc, which is expressed by the following equation may be used for computation.

$$Y=Y_0+(Y_0-Y_{-1})\frac{T_d}{T}$$

In the above expression, the quantity $$\frac{Y_0-Y_{-1}}{T}$$

represents the rate of increase of the mean value of Y up to the time under consideration. Therefore, the product resulting from multiplying this quantity by $T_d$ represents the quantity attained by Y by the time $T_d$ in the case when Y varies at the same rate as that up to the time under consideration, and the sum of $Y_0$ added to the said product becomes the preestimated value leading by $T_d$. This value results from an approximation by only a first-degree differentiation, and by a higher degree differentiation it is also possible to use a closer approximation.

Although the embodiments of the invention described above in conjunction with FIGS. 6 and 7 are each indicated for the integrator circuit of one channel, it is to be understood that each of these embodiments are applicable with respect to each of the integrators $I_1$, $I_2$, . . . of the numerous channels indicated in FIG. 2.

As indicated above, the addition of a circuit such as to cause signals to lead by $$\tau+\frac{T}{2}\left(1-\frac{1}{n}\right)^2$$

to a time-sharing computer setup has a great effect in increasing the accuracy and in lowering the sampling period.

As described above, the circuit composition and arrangement of the analog computer according to the present invention is substantially simplified by a time-sharing method.

Moreover, the error arising from the adoption of the time sharing method is greatly reduced. Accordingly, the present invention is highly effective in a wide range of practical applications.

More specifically, the present invention is highly effective in applications to analog simulators such as, for example, a flight simulator wherein an engine computer carries out exactly the same computation with only the input differing for three engines, and, moreover, is effective in applications also with respect to general-purpose analog computers.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. A time-shared analog computer and simulator comprising:

a computing element commonly used for a plurality of channels; first changeover switches for scanning the input of said computer and simulator and supplying said input to the input of said computing element; a plurality of holding circuits to hold the respective channel outputs of said computing element; second changeover switches for scanning the input of said holding circuit and supplying said output of the computing element to the input of the holding circuit; a plurality of integrators to integrate the output of said holding circuit; and a plurality of potentiometers and sign changers connected to said potentiometers in series to add the output of the holding circuit to the output of the integrator, thereby compensating errors due to dead time corresponding to the quantity represented by $$\tau+\frac{T}{2}\left(1-\frac{1}{n}\right)^2$$

wherein $\tau$ denotes the dead time required for computation, T denotes the scanning period, and $T/n$ represents the time interval during which each of said holding circuits is connected to the output of said computing element and correctly follows up variations in the output of said computing element within one cyclic period.

2. A time-shared analog computer and simulator comprising:

a computing element commonly used for a plurality of channels; first change-over switches for scanning the input of said computer and simulator and supplying said input to the input of said computing element; a plurality of holding circuits to hold the respective channel outputs of said computing element; second changeover switches for scanning the input of said holding circuit and supplying said output of the computing element to the input of the holding circuit; a plurality of integrators to integrate the output of said holding circuit; a plurality of capacitors connected in parallel with an input resistance of each of said integrators inserted between said output of holding circuit and said input of integrator, thereby compensating errors due to dead time corresponding to the quantity represented by $$\tau+\frac{T}{2}\left(1-\frac{1}{n}\right)^2$$

wherein $\tau$ denotes the time required for computation, T denotes the scanning period, and $T/n$ represents the time interval during which each of said holding circuits is connected to the output of said computing element and correctly follows up variations in the output of said computing element within one cyclic period.

3. A time-shared analog computer and simulator comprising:

a computing element commonly used for a plurality of channels; first changeover switches for scanning the input of said computer and simulator and supplying said input to the input of said computing element; a plurality of holding circuits to hold the respective channel outputs of said computing element provided with one channel of said two circuits; second changeover switches for scanning the input of said holding circuit and supplying said output of the computing element to the input of the holding circuit; first supplying switches for supplying the output of said second changeover switches to said two holding circuits alternately for every period; second supplying switches switched synchronously by said first supplying switches for supplying the output of said two holding circuits to a computing device to compute Y expressed by $$Y=Y_0+(Y_0-Y_{-1})\frac{T_d}{T}$$

wherein $Y_0$ denotes the value sampled and stored in said holding circuit immediately prior to any time under consideration, $Y_{-1}$ denotes the value sampled and stored in said holding circuit, which is earlier by one period of the $Y_0$, thereby compensating errors due to dead time corresponding to the quantity represented by $$\tau+\frac{T}{2}\left(1-\frac{1}{n}\right)^2$$

wherein $\tau$ denotes the dead time required for computation, T denotes the scanning period, and $T/n$ represents the time interval during which each of said holding circuits is connected to the output of said computing element and correctly follows up variations in the output of said computing element within one cyclic period.

References Cited

UNITED STATES PATENTS 3,264,456 8/1966 Gruet ------------ 325—150.51

MALCOLM A. MORRISON, *Primary Examiner.*

J. RUGGIERO, *Assistant Examiner.*